United States Patent
Jung

(10) Patent No.: US 9,591,659 B2
(45) Date of Patent: *Mar. 7, 2017

(54) APPARATUS AND METHOD FOR AUTOMATION OF FREQUENCY RESOURCE MANAGEMENT OF IMS-BASED WIRELESS VIDEO SURVEILLANCE SYSTEM

(71) Applicant: Samsung Electronics Co., Ltd., Gyeonggi-do (KR)

(72) Inventor: Kyung Hun Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

This patent is subject to a terminal disclaimer.

(21) Appl. No.: 14/385,763

(22) PCT Filed: Mar. 15, 2013

(86) PCT No.: PCT/KR2013/002091
§ 371 (c)(1),
(2) Date: Sep. 16, 2014

(87) PCT Pub. No.: WO2013/137675
PCT Pub. Date: Sep. 19, 2013

(65) Prior Publication Data
US 2015/0103763 A1    Apr. 16, 2015

(30) Foreign Application Priority Data
Mar. 16, 2012  (KR) .................. 10-2012-0026930

(51) Int. Cl.
*H04W 72/08* (2009.01)
*H04W 28/24* (2009.01)
(Continued)

(52) U.S. Cl.
CPC ......... *H04W 72/085* (2013.01); *H04W 28/24* (2013.01); *H04W 72/10* (2013.01);
(Continued)

(58) Field of Classification Search
None
See application file for complete search history.

(56) References Cited

U.S. PATENT DOCUMENTS

2001/0047517 A1* 11/2001 Christopoulos ........... G06T 1/00
725/87
2009/0268752 A1 10/2009 Miyazaki et al.
(Continued)

FOREIGN PATENT DOCUMENTS

EP           2429190 A1    3/2012
JP           2004-357002   12/2004

OTHER PUBLICATIONS

International Search Report dated Jun. 24, 2013 in connection with International Patent Application No. PCT/KR2013/002091, 5 pages.
(Continued)

*Primary Examiner* — Mohammad Adhami

(57) ABSTRACT

The present invention relates to a method and an apparatus for efficiently requesting and allocating a wireless resource. According to one embodiment of the present invention, a method for requesting a resource comprises: a step of receiving target criteria for video quality from a server; a first determination step of determining whether the video quality matches the target criteria based on a peak signal-to-noise ratio (PSNR) or a frame rate; and, if the video quality does not match, a step of requesting the server to allocate an additional resource. According to one embodiment of the present invention, the use of a video surveillance system resource can be minimized and video quality can be easily ensured.

18 Claims, 10 Drawing Sheets

(51) Int. Cl.
*H04W 72/10* (2009.01)
*H04N 7/18* (2006.01)
*H04W 28/06* (2009.01)
*H04W 72/04* (2009.01)

(52) U.S. Cl.
CPC ............... *H04N 7/18* (2013.01); *H04W 28/06* (2013.01); *H04W 72/0413* (2013.01)

(56) References Cited

U.S. PATENT DOCUMENTS

| | | | |
|---|---|---|---|
| 2010/0098047 A1* | 4/2010 | Zhou | H04L 47/10 370/345 |
| 2011/0149145 A1* | 6/2011 | Ramos | H04N 21/23439 348/441 |
| 2011/0222406 A1 | 9/2011 | Persson et al. | |
| 2011/0255555 A1 | 10/2011 | Alexander | |
| 2012/0103785 A1* | 5/2012 | Shi | B01D 1/0035 202/234 |
| 2013/0064110 A1* | 3/2013 | Polinati | H04L 41/5035 370/252 |
| 2013/0095806 A1* | 4/2013 | Salkintzis | H04L 65/601 455/414.3 |

OTHER PUBLICATIONS

Written Opinion of International Searching Authority dated Jun. 24, 2013 in connection with International Patent Application No. PCT/KR2013/002091, 4 pages.

* cited by examiner

FIG. 7

| SDP offer |
|---|
| m=video 49154 RTP/AVP 99<br>b=AS:300<br>b=RS:2500<br>b=RR:0<br>a=rtpmap:99 H264/90000<br>a=fmtp:99 packetization-mode=0; packetization-mode=0<br>    sprop-parameter-sets=J0LgDZWgUH6Af1A=,KM46gA==<br>a=sendonly | ary of the Invention -->
APPARATUS AND METHOD FOR AUTOMATION OF FREQUENCY RESOURCE MANAGEMENT OF IMS-BASED WIRELESS VIDEO SURVEILLANCE SYSTEM

CROSS-REFERENCE TO RELATED APPLICATION S

The present application claims priority under 35 U.S.C. §365 to International Patent Application No. PCT/KR2013/002091 filed Mar. 15, 2013, entitled "APPARATUS AND METHOD FOR AUTOMATION OF FREQUENCY RESOURCE MANAGEMENT OF IMS-BASED WIRELESS VIDEO SURVEILLANE SYSTEM". International Patent Application No. PCT/KR2013/002091 claims priority under 35 U.S.C. §365 and/or 35 U.S.C. §119(a) to Korean Patent Application No. 10-2012-0026930 filed Mar. 16, 2012 and which are incorporated herein by reference into the present disclosure as if fully set forth herein.

TECHNICAL FIELD

The present invention relates to a method of managing radio resource efficiently based on the IP Multimedia Subsystem (IMS). In particular, the present invention relates to a method and apparatus for allocating radio resource to a terminal based on a spatiotemporal range corresponding to the required video quality on a PSNR-frame rate plane.

BACKGROUND ART

A large scale dedicated facility such as shipyard, factory, and campus isolated from the outside world may be built along with a video surveillance system based on a high-speed wireless network such as LTE and Wi-Fi. Such a video surveillance system is characterized in requiring radio resource higher in reliability than the peer-to-peer video communication.

Thus, there is a need of building a video surveillance system allowing for use of a resource band appropriately for the characteristic of the place in the large scale facility.

IP Multimedia Subsystem (IMS) is a system for managing the resource, quality, and security of the network using Internet transfer technology such as HSPA, LTE, Wi-Fi, and wired communication network. The IMS-based radio resource management is a method applied to the 4$^{th}$ Generation mobile communication such as Voice over LTE (VoLTE) and specified in 3GPP TS 23.228.

FIG. 1A is a diagram illustrating the role of IMS in the conventional packet switched network. As shown in FIG. 1A, the IMS is responsible for facilitating provision of various application services to a plurality of terminals using the network such as LTE.

FIG. 1B is a block diagram illustrating a basic configuration of the IMS.

As shown in FIG. 1B, IMS is made up of various network nodes including four types of Call Session Control Functions (CSCFs) (i.e. Proxy-CSCF (P-CSCF), Serving-CSCF (S-CSCF), Interrogating-CSCF (I-CSCF), and Emergency-CSCF (E-CSCF)), Home Subscriber server (HSS), Subscription Locator Function (SLF), and Application Server (AS).

Via such nodes, the terminal exchange Session Initiation Protocol/Session Description Protocol (SIP/SDP) messages with servers or other terminals and determine communication-related conditions. At this time, the network management and resource allocation policies are determined too.

DISCLOSURE OF INVENTION

Technical Problem

The present invention aims to provide a method and apparatus for utilizing the resource of the IMS-based wireless video surveillance system efficiently.

Also, the present invention aims to provide a method and apparatus for maximizing video quality while minimizing the use of radio resource.

Solution to Problem

In accordance with an aspect of the present invention, a resource request method of a terminal includes receiving a target level of video quality from a server, determining firstly whether the video quality fulfils the target level based on Peak Signal to Noise Ratio (PSNR) or frame rate, and requesting, when the video quality does not fulfil the target level, a server for additional resource allocation.

In accordance with another aspect of the present invention, a resource allocation method of a server includes configuring a target level of video quality based on Peak Signal to Noise Ratio (PSNR) and frame rate, checking, at a network, priority of a terminal, and allocating firstly resource to the terminal based on the target level or the priority.

In accordance with another aspect of the present invention, a resource request apparatus of a terminal includes a communication unit which receives a target level of video quality from a server and a control unit which determines whether the video quality fulfils the target level based on Peak Signal to Noise Ratio (PSNR) or frame rate and requests, when the video quality does not fulfil the target level, a server for additional resource allocation.

In accordance with still another aspect of the present invention, a resource allocation apparatus of a server includes a control unit which configures a target level of video quality based on Peak Signal to Noise Ratio (PSNR) and frame rate, checks, at a network, priority of a terminal, and allocates resource to the terminal based on the target level or the priority and a communication unit which receives a resource allocation request from the terminal.

Advantageous Effects of Invention

The radio resource management apparatus and method of the present invention is advantageous in terms of facilitating video quality improvement while minimizing resource use of the video surveillance system.

Also, the radio resource management and apparatus of the present invention is advantageous in terms of applying the resource allocation independently of the access network type such as LTE, Wi-Fi, and wired network.

BRIEF DESCRIPTION OF DRAWINGS

FIG. 7 is a diagram illustrating a format of SDP Offer of the UE according to an embodiment of the present invention.

MODE FOR THE INVENTION

Figure 1A:
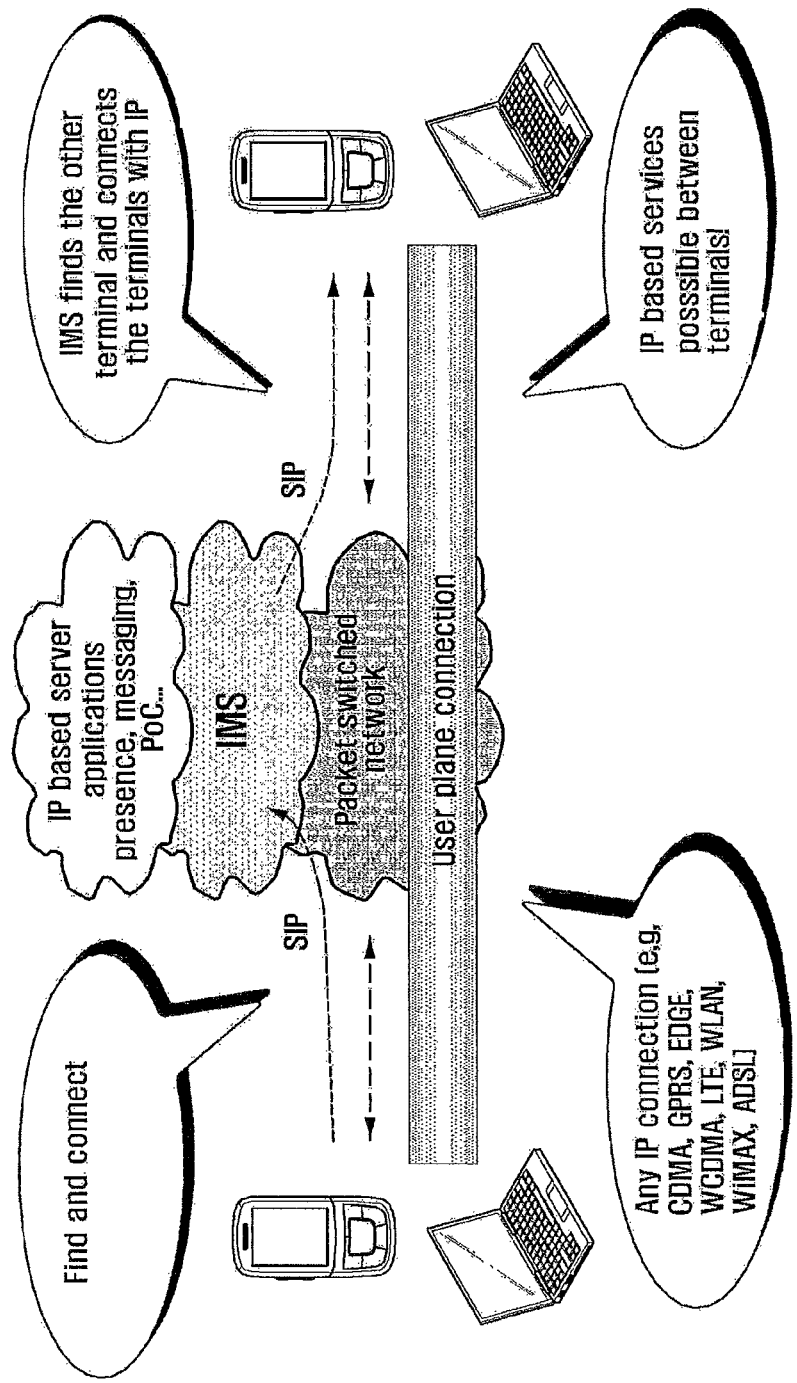
FIG. 1A is a diagram illustrating the role of IMS in the conventional packet switched network.
Figure 1B:
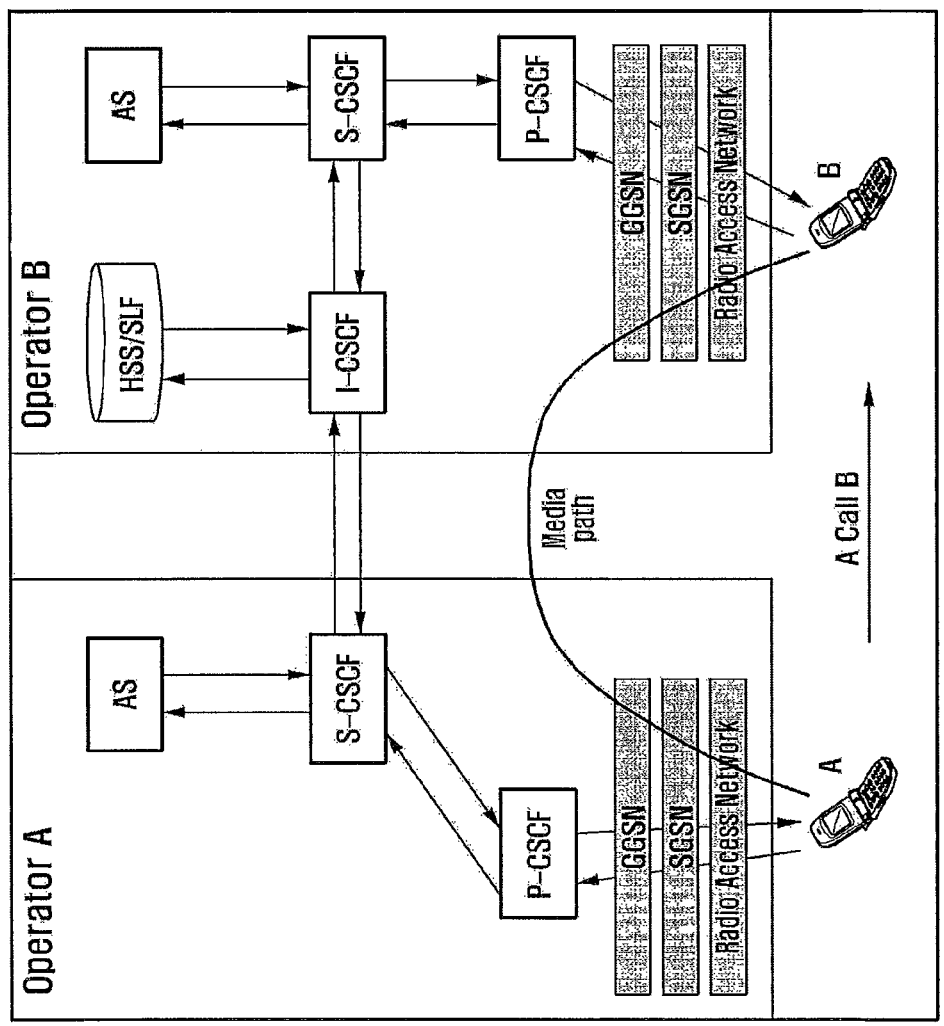
FIG. 1B is a block diagram illustrating a basic configuration of the IMS.

The present invention is not limited to the following description of embodiments, and it is obvious to those skilled in the art that various modifications can be made without departing from the scope of the present invention. Detailed description of well-known functions and structures incorporated herein may be omitted to avoid obscuring the subject matter of the present invention.

The same reference numbers are used throughout the drawings to refer to the same or like parts. Some of elements are exaggerated, omitted or simplified in the drawings and the elements may have sizes and/or shapes different from those shown in drawings, in practice. This aims to omit unnecessary description so as to make the subject matter of the present invention clear. Exemplary embodiments of the present invention are described with reference to the accompanying drawings in detail.

Figure 2:
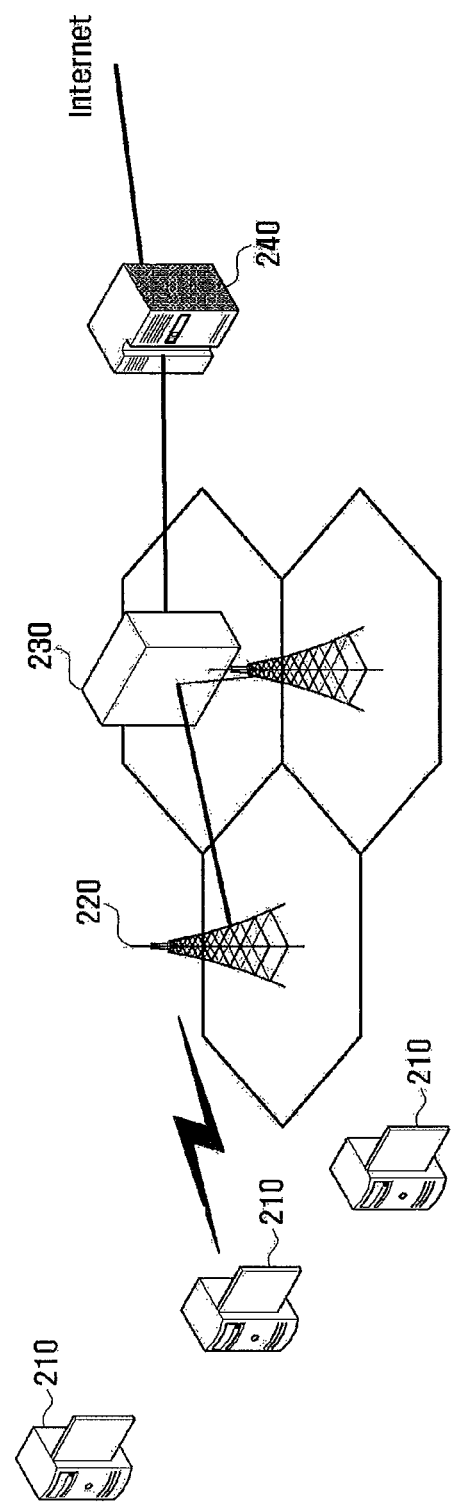
FIG. 2 is a diagram illustrating an IMS-based wireless video surveillance system implemented in an LTE network according to an embodiment of the present invention.

FIG. 2 is a diagram illustrating an IMS-based wireless video surveillance system implemented in an LTE network according to an embodiment of the present invention.

As shown in FIG. 2, a plurality of camera-equipped User Equipment (UEs) 210 connect to an evolved Node B (eNodeB) 220 wirelessly. The eNB 220, a gateway 220, and the server 240 are connected through wired links according to an embodiment of the present invention.

The UE 210 takes a video and transmits the video in a compressed format, and the compressed image may be stored in a separate storage device or checked outside through the Internet. At this time, a camera of each UE 210 may accomplish high video quality at a low bitrate in the case of compressing the video having small movement or simple background but require high bitrate for maintaining the high video quality in the case of compressing the video having large movement or complex background.

If the UE compresses the video at a fixed bitrate always, this may cause degradation of video quality below a required level or resource waste for using high bitrate unnecessarily depending on the video content.

The IMS-based server 240 is responsible for allocating radio resource to the UEs 210 of the video surveillance system efficiently. Here, the radio resource denotes the bitrate allocated to the UEs 210 by the server 240. According to an embodiment of the present invention, the server 240 allocates a bitrate appropriate enough to compress the video content while maintaining the best video quality, and the procedure for the server 240 to allocate or decrease the bitrate requested by the UE 210 through negotiation is referred to as Quality of Service (QoS) Reservation.

Figure 3:
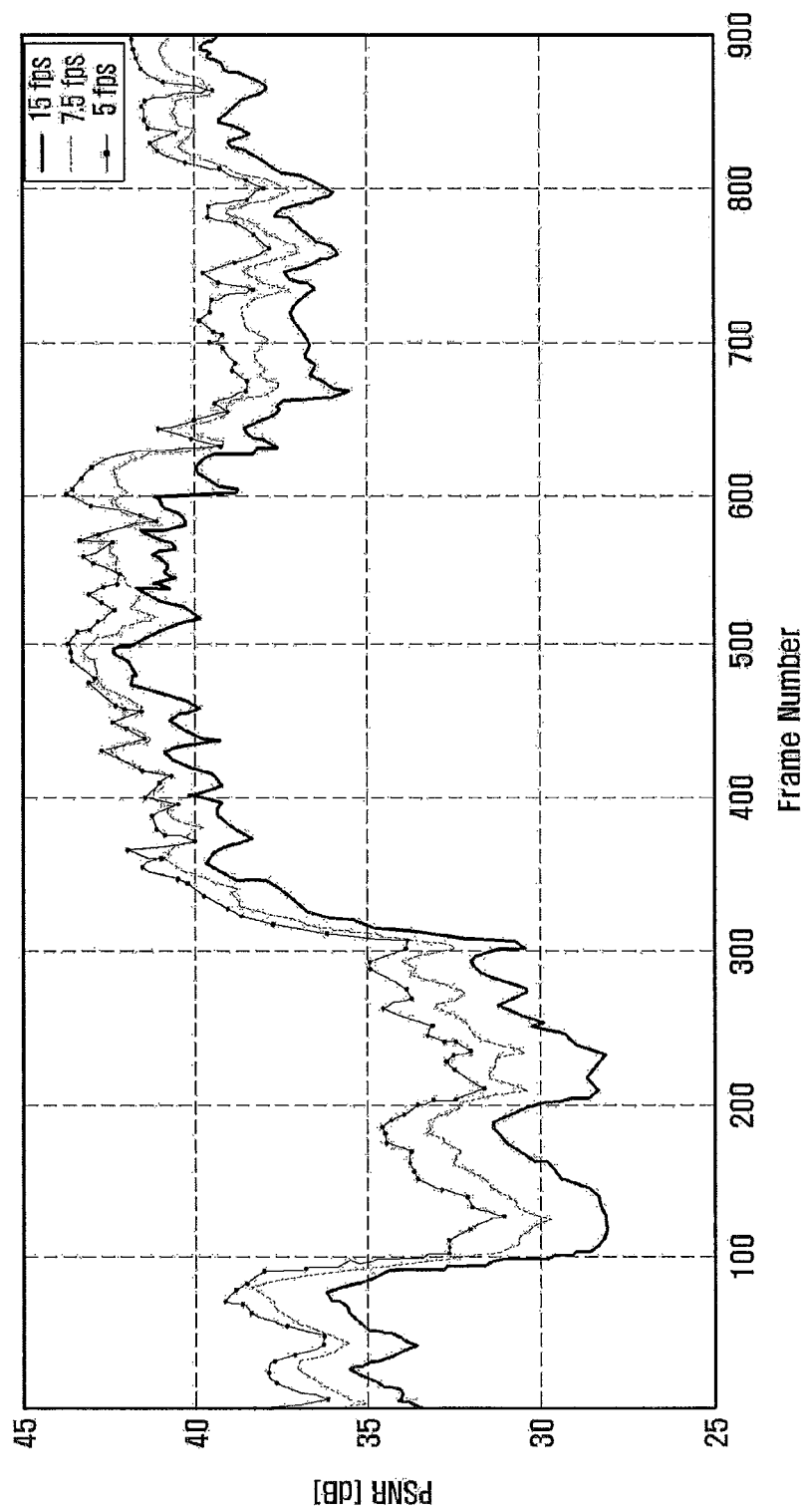
FIG. 3 is a graph illustrating variation of Peak Signal to Noise Ratio (PSNR) in compressing the same video at the rates of 5, 7.5, and 15 frames per second.

FIG. 3 is a graph illustrating variation of Peak Signal to Noise Ratio (PSNR) in compressing the same video at the rates of 5, 7.5, and 15 frames per second. As the PSNR value increases, the difference from the uncompressed frame decreases, resulting in good video quality.

As shown in FIG. 3, if the number of frames per second (frame rate) increases at the same bitrate (e.g. 48 kbps), the PSNR decreases gradually. That is, assuming the same bitrate, the video quality decreases as the frame rate increases.

FIG. 3 also shows the video quality according to the change of background. In FIG. 3, the first ⅓ part of the video is very complicate part during which the background changes abruptly such that the PSNR value is equal to or less than 35 dB averagely at all frame rates. The last ⅓ part of the video is a part during which a certain area changes on the fixed background such that the PSNR is equal to or greater than 40 dB averagely. The intermediate ⅓ part of the video has an intermediate level of change such that the PSNR is in the range of 42 to 43 dB averagely. That is, if the bitrate is fixed, the video quality decreases as the background becomes complicate independently of the frame rate.

This means that there is a need of adjusting the bitrate, PSNR, and frame rate according to the purpose of the video surveillance system and the captured video content.

The video quality can be improved by increasing the bitrate at a low PSNR, and the PSNR can be increased by decreasing the frame rate at the same bitrate. The frame rate can be increased by increasing the bitrate at a high PSNR, and the bitrate can be increased in a situation where both the PSNR and frame rate high enough, thereby reaching the saturation state having no extra quality enhancement despite increase of the bitrate.

Figure 4:
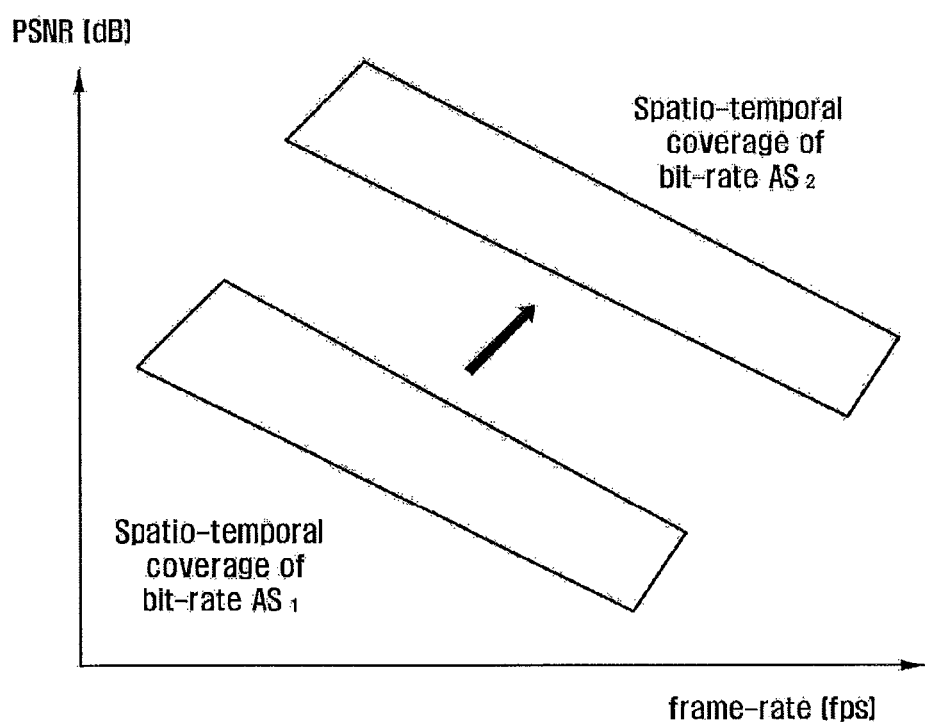
FIG. 4 is a graph illustrating a spatiotemporal range in which PSNR and frame rate can be adjusted when compressing videos $AS_1$ and $AS_2$ at different bitrates.

FIG. 4 is a graph illustrating a spatiotemporal range in which PSNR and frame rate can be adjusted when compressing videos $AS_1$ and $AS_2$ at different bitrates. Here, $AS_1 < AS_2$ and images sizes are identical with each other.

According to an embodiment of the present invention, the server 240 may present the target level of the video quality required by the UE 210 as a spatiotemporal range made up of at least two coordinates on a PSNR-frame rate plane.

In the video surveillance system, it is difficult to recognize an object or a person on the screen at a very low PSNR and difficult the check the movement of the object at a very low frame rate. Accordingly, it is necessary to maintain the PSNR or frame rate over an appropriate value depending on the purpose, which can be achieved in such a way that the server 240 designates a target spatiotemporal range. In a preferred embodiment of the present invention, the spatiotemporal range is defined with at least three coordinates on the PSNR-fps plane.

Meanwhile, the UE 210 may determine whether the video compressed for transmission reaches the target level based on the spatiotemporal range as shown in FIG. 4. That is, the UE 210 checks the PSNR and frame rate of the compressed video and, when the PSNR and frame rate within the spatiotemporal range, determines that the QoS is secured.

If it is impossible to accomplish the target levels of both the PSNR and frame rate at a certain bitrate, i.e. if the PSNR and frame rate of the compressed video are out of the spatiotemporal range, the UE 210 may change the compression scheme or request the server 240 for addition radio resource allocation.

If it is possible to achieve the quality level high enough with the currently allocated radio resource, the redundant radio resource may be withdrawn for providing other UE with the service. In this way, the UE 210 may move the PSNR and frame rate of the compressed video into the spatiotemporal range so as to achieve the target quality.

Figure 5:
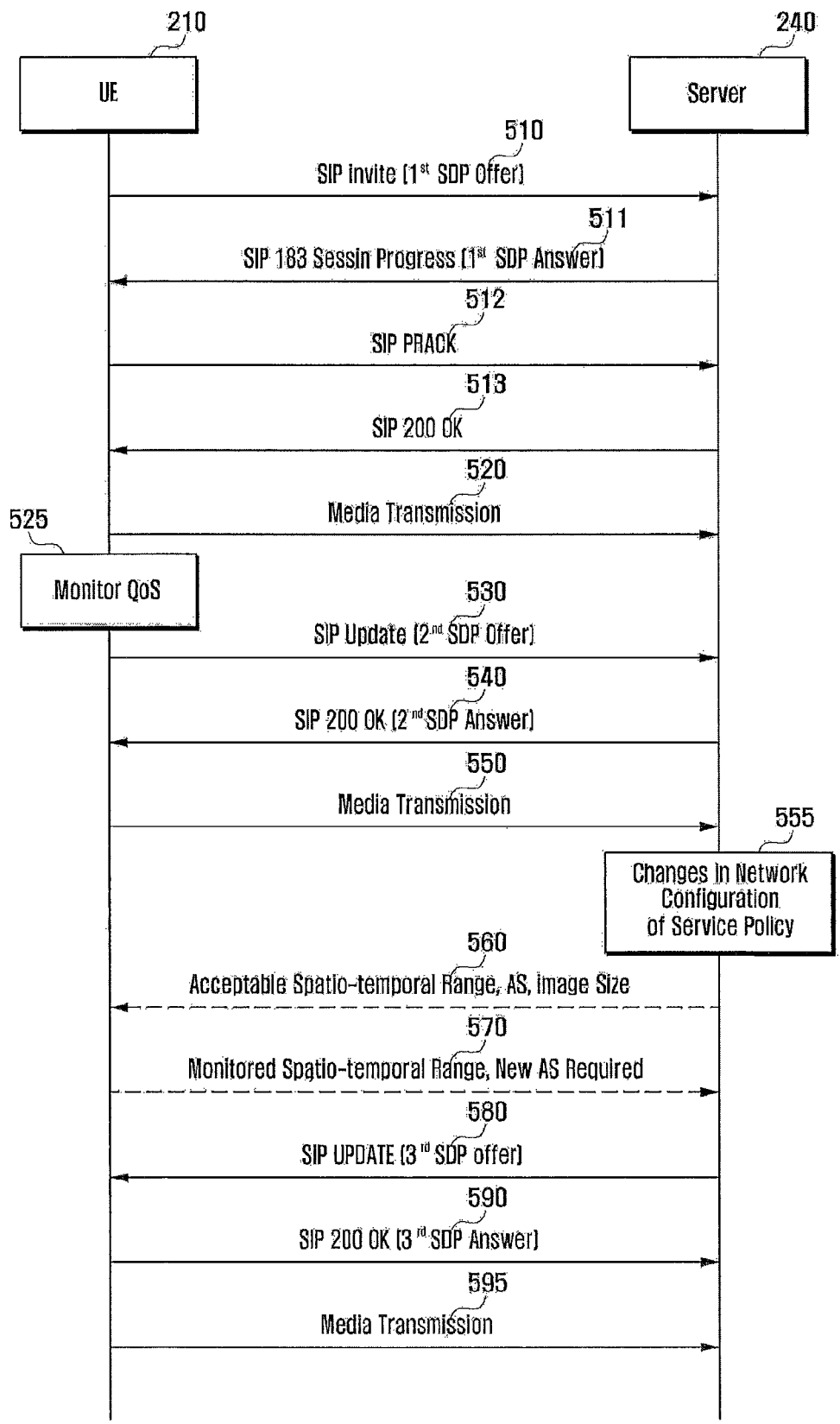
FIG. 5 is a signal flow diagram illustrating a procedure for the server to allocate radio resource to the UE and for the UE to request the server for radio resource allocation according to an embodiment of the present invention.

FIG. 5 is a signal flow diagram illustrating a procedure for the server 240 to allocate radio resource to the UE 210 and for the UE to request the server for radio resource allocation according to an embodiment of the present invention.

Figure 6:
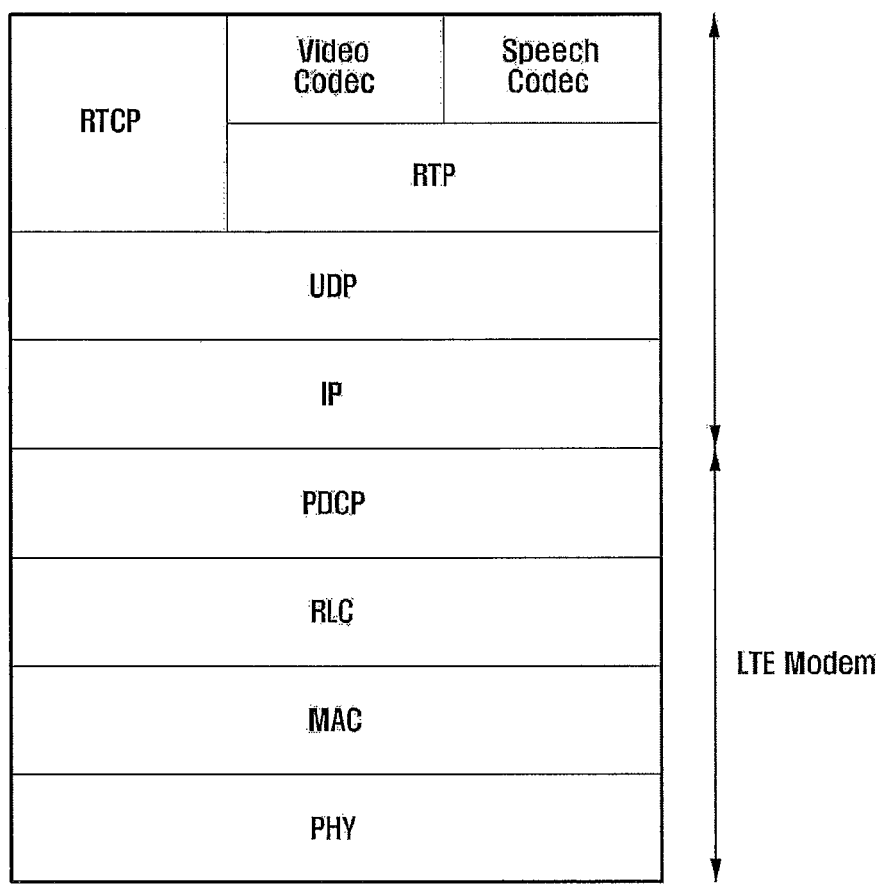
FIG. 6 is a diagram illustrating a protocol stack of the UE according to an embodiment of the present invention.

The protocol stack of the UE is shown in FIG. 6, and a video codec adds RTP, UDP, and IP headers to the video taken by the camera such that the compressed video data is transmitted to the eNB by means of the modem. At this time, the UE and the server negotiate the bitrate in the state that the RTP, UDP, and IP headers are added to the video data based on the IMS.

Steps 510 to 513 of FIG. 5 are a process of negotiating the compression conditions of the video between the UE 210 and the server 240. The UE 210 sends the server 240 an SIP Invite message including an SDP offer at step 510 to initiate video compression condition negotiation, and the SDP offer is formatted as shown in FIG. 7. In FIG. 7, b=AS:300 is the information indicating that the UE will send the server the video data including RTP, UDP, and IP headers at the bitrate of 300 kbps.

The UE 210 and the server 240 negotiate this condition through steps 511 and 513, and the UE 210 transmits the compressed video to the server 540 at step 520.

The UE 210 checks whether the operation state of the current compressor is within the target spatiotemporal range in the course of transmitting the compressed video to the server at step 515. For example, if the operation state is out of the range over a predetermined time (T), the terminal 210 may change the compression scheme.

If the operation state is not within the spatiotemporal range yet even after change of the compression scheme, the UE 210 may request the server to increase the bitrate using a SIP Update message at step 530. If the server 240 accepts this at step 540, the UE is allocated additional radio resource to continue transmitting the compressed video to the server 240 at step 550.

If the bitrate that can be allocated to the UE is changed due to the change of network structure or increase of traffic, the server 240 may check occurrence of such an event at step 555.

In the state of receiving the compressed video transmitted by a plurality UEs located in different cells of the radio network, the server 240 may reconfigure the bitrate (AS) values for the UEs totally for the change of the transmission condition such as weather condition or the necessity of allocating high bitrates to specific UEs in charge of important videos. Step 555 is of checking such event.

The problem of how the server 250 gives a relative weight and allocates or reallocates a bitrate according to the priority of the UE may be solve through a mathematical method such as linear programming.

In more detail, the server 240 may determine the transmission priority per UE in the serving cell, priority in a specific cell group, and priority in the whole network, and these priorities may differ from the priorities of the bitrates allocated in the serving cell, specific cell group, and whole network.

The UE may belong to a plurality of cell groups, and the priority of the serving cell may be expressed as (cell_id_k, n), the priority in the cell group as (cell_id_1, . . . , cell_id_k, n), and the priority in the whole network as (cell_id_all, n) (n is a natural number).

The problem of how to allocate the transmission capacity remained after allocation for voice and data services to the video surveillance system may be defined mathematically as follows.

$AS_{Total}=AS_1+AS_2+ \ldots +AS_N$. ($AS_i$ is 0 or a positive integer, number of UEs=N)

The weight in the serving cell is expressed as (cell_id_k, w), the weight in the cell group as (cell_id_1, . . . , cell_id_k, w), the weight in the whole network as (cell_id_all, w) (where w is a real number).

The problem of allocating/reallocating bitrate to the UE is a linear programming problem as follows:

$$\max \sum_i w_i AS_i,$$

and if various constraints such as $AS_{Total}$ and $AS_i>0$ for i are fulfilled, the bitrate is allocated. After reallocating the bitrate in consideration of the bitrate requested by the UE and reported spatiotemporal range, priority and weight stored in the server, the server allocates bitrate newly to the UE having $AS_i>0$ of which bitrate differs from the previously allocated bitrate and commands the UE having AS; equal to or less than 0 to step transmitting video transmission.

When an event occurs in the network at step 555, the server 240 checks per-UE priorities in the serving cell, specific cell group, and whole network and withdraws the bitrate allocated to the UEs having low priorities for allocation to the UEs having high priorities if necessary.

The server 240 may send the UE 210 the information such as new quality condition, bitrate, video size, and spatiotemporal range. However, such information is transmitted to the UE 210 through a separate data transfer channel other than SIP/SDP message because the conventional SIP/SDP does not support such function.

Meanwhile, the terminal 210 may request for a preferred bitrate in transmitting the spatiotemporal range recorded for certain duration to the server at step 570.

The server 240 sends the UE a SIP Update message based on the new transmission condition at step 580, and the UE 210 negotiates the new condition to be allocated the radio resource at step 590. Through this procedure, the UE 210 transmits the video to the server at step 595.

Figure 8:
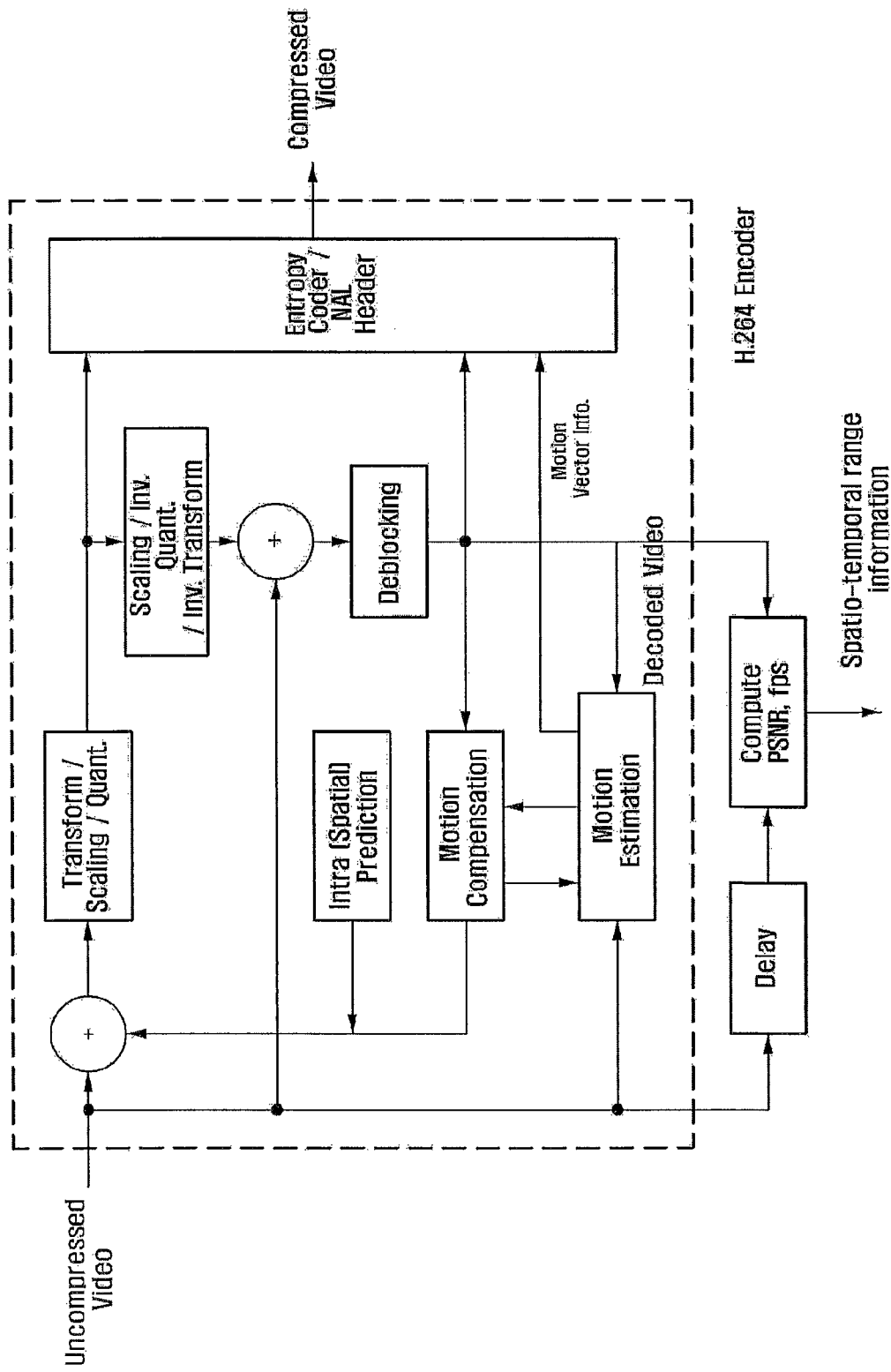
FIG. 8 is a block diagram illustrating a configuration of a compressor of the UE according to an embodiment of the present invention.

FIG. 8 is a block diagram illustrating a configuration of a compressor of the UE 210 according to an embodiment of the present invention.

Although the frame rate information may be calculated in the process of recovering the received video at the server, the PSNR information can be acquired only at the UE. As shown in FIG. 8, the UE 210 may calculate the PSNR by comparing the video reconstructed after being compressed and uncompressed vide per video frame. That is, whether the current compress state complies with the target spatiotemporal range can be checked only by the UE.

In FIG. 8, the PSNR and the number of frames per second (fps) from a certain previous time to the time when the frame is compressed may be recorded as coordinates on a 2-dimensional PSNR-fps plane.

Figure 9:
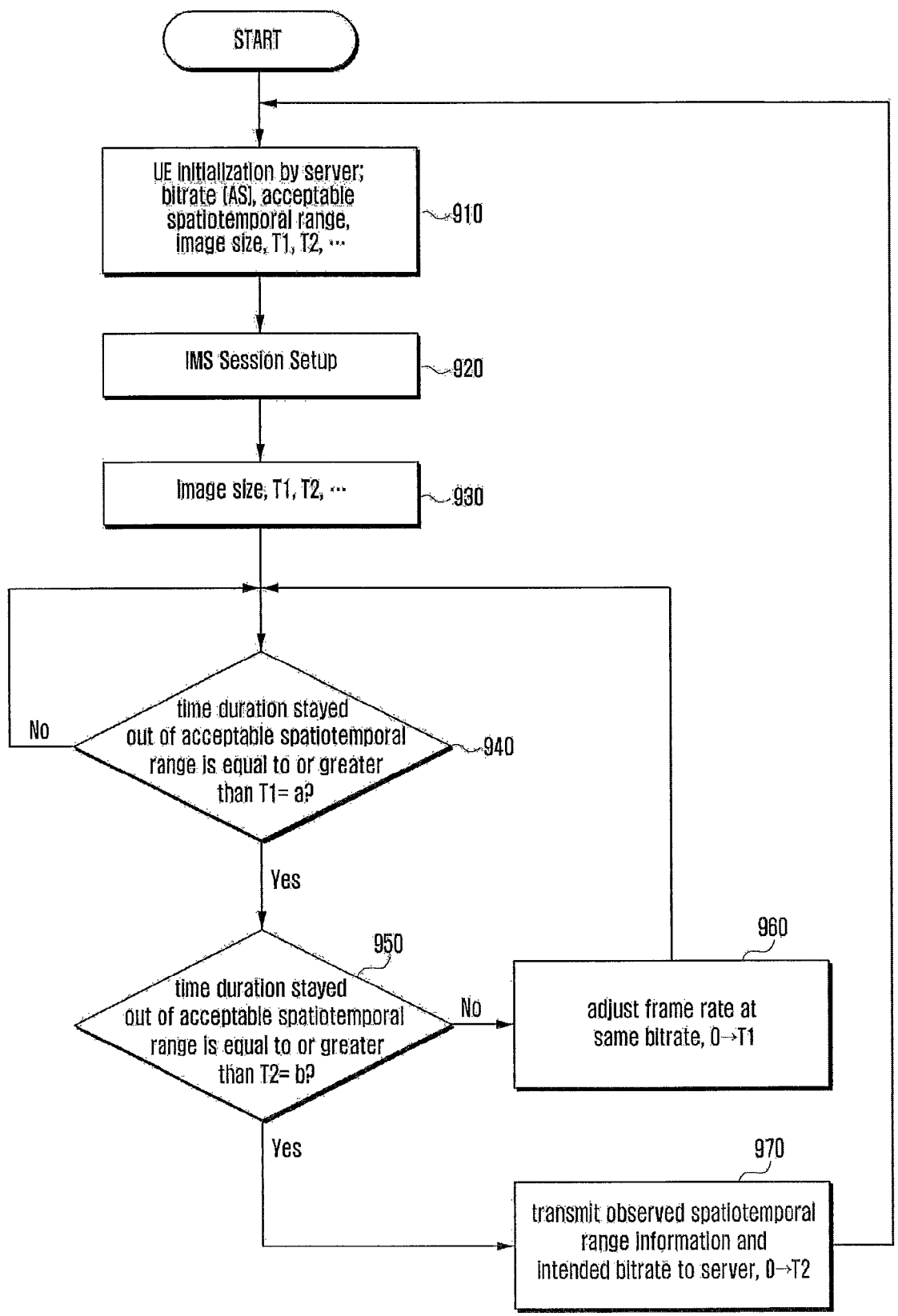
FIG. 9 is a flowchart illustrating the radio resource negotiation procedure according to an embodiment of the present invention.

FIG. 9 is a flowchart illustrating the radio resource negotiation procedure of FIG. 5. The flowchart may be depicted differently depending on the goal of the service and available bitrate.

The server 240 initializes the spatiotemporal range, bitrate (AS), image size and timer thresholds T1 and T2 accepted by the UE 210 at step 910 and sets up an IMS session at step 920.

The terminal 210 negotiate the radio resource fulfilling the above conditions with the network and transmits video to the server 240 at step 930.

The UE 210 determines whether the current video compression state of the video compressor fulfils the QoS based on the spatiotemporal range at step 940. The UE 210 determines whether the video compression state is out of the spatiotemporal range over predetermined time of 'a' seconds.

If the time duration for which the video compression state is out of the spatiotemporal range is equal to or greater than 'a' seconds, the procedure goes to step 950. At step 950, if the time duration for which the video compression state is out of the spatiotemporal range is equal to or greater than 'a' seconds, the UE 210 determines whether the timer T2 has elapsed 'b' seconds in the state that the timer T2 is running at step 950.

If the time duration for which the video compression state is out of the spatiotemporal range is equal to or greater than 'a' seconds but if the timer T2 has not elapsed 'b' seconds, the UE 210 adjusts the frame rate at the same bitrate and resets the timer T1 at step 960.

If both the timers T1 and T2 have elapsed the preset times a and b, the terminal sends the server 240 the observed spatiotemporal range information and intended additional resource allocation information and resets the timer T2 at step 970.

The present invention provides a method for maximizing the video quality while minimizing the use of radio resource in a situation of managing the wireless video surveillance system made up of a plurality of UEs and a server managing the UEs through IMS. The present invention can be applied to various types of wireless/wired networks such as LTE, Wi-Fi, and wired network.

Although various embodiments of the present invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A resource request method of a terminal, the method comprising:
receiving a video quality target level from a server;
determining if a video quality of a video is not less than the video quality target level based on at least one of a Peak Signal to Noise Ratio (PSNR) or a frame rate of the video; and
requesting an additional resource allocation from the server if the video quality of the video is less than the video quality target level,
wherein the video quality target level is configured by the server in a range formed of at least two coordinate on a PSNR and frame-rate plane.

2. The method of claim 1, further comprising before requesting the additional resource allocation:
changing a video compression scheme of the video after determining that the video quality of the video is less than the video quality target level; and
determining if the video quality of the video is not less than the video quality target level after changing the video compression scheme of the video.

3. The method of claim 1, further comprising requesting the server to withdraw redundant resources if the video quality of the video is not less than the video quality target level.

4. The method of claim 1, further comprising:
measuring at least one of the PSNR or the frame rate of the video after receiving the video quality target level; and
reporting a measurement of at least one of the PSNR or the frame rate of the video to the server.

5. A resource allocation method of a server, the method comprising:
configuring a video quality target level based on at least one of a Peak Signal to Noise Ratio (PSNR) or frame rate, wherein the video quality target level comprises a spatiotemporal range, and wherein the spatiotemporal range includes at least two coordinates on a PSNR-frame rate plane;
transmitting the configured video quality target level to a terminal;
checking a priority of the terminal at a network; and
allocating a resource to the terminal based on at least one of the video quality target level or the priority of the terminal.

6. The method of claim 5, further comprising:
receiving from the terminal an allocation request for an additional resource or a resource withdrawal request after allocating the resource to the terminal; and
allocating the additional resource to the terminal in response to receiving the allocation request for the additional resource from the terminal.

7. The method of claim 5, further comprising:
changing a priority of the terminal according to a change of a network structure or an increase in network traffic; and
allocating an additional resource to the terminal based on a change in priority of the terminal.

8. A resource request apparatus of a terminal, the apparatus comprising:
a communication unit configured to receive a video quality target level from a server; and
a control unit coupled to the communication unit, wherein the control unit is configured to determine if a video quality of a video is not less than the video quality target level based on at least one of a Peak Signal to Noise Ratio (PSNR) or a frame rate of the video and request a server for a resource allocation if the video quality is less than the video quality target level,
wherein the video quality target level is configured by the server in a range formed of at least two coordinates on a PSNR and frame-rate plane.

9. The apparatus of claim 8, wherein the control unit is configured to change a video compression if the video quality of the video is less than the video quality target level.

10. The apparatus of claim 8, wherein the control unit is configured to request the server to withdraw redundant resource if the video quality of the video is not less than the video quality target level.

11. The apparatus of claim 8, wherein the control unit is configured to control measuring of at least one of the PSNR or frame rate of the video and report a measurement of at least one of the PSNR or the frame rate of the video to the server.

12. A resource allocation apparatus of a server, the apparatus comprising:
   a control unit configured to:
      configure a video quality target level based on at least one of a Peak Signal to Noise Ratio (PSNR) or frame rate, wherein the video quality target level comprises a spatiotemporal range, and wherein the spatiotemporal range includes at least two coordinates on a PSNR-frame rate plane,
      transmit the configured video quality target level to a terminal;
      check a priority of the terminal at a network, and
      allocate a resource to the terminal based on the video quality target level or the priority of the terminal; and
   a communication unit configured to receive a resource allocation request from the terminal.

13. The apparatus of claim 12, wherein the communication unit is configured to receive from the terminal an allocation request for an additional resource or a resource withdrawal request, and the control unit is configured to allocate the additional resource to the terminal in response to the allocation request for the additional resource from the terminal.

14. The apparatus of claim 12, wherein the control unit is configured to change a priority of the terminal according to a change of a network structure or an increase in network traffic and allocate the resource to the terminal based on a change in the priority of the terminal.

15. A resource allocation method of a server, the method comprising:
   configuring a video quality target level in a range formed of at least two coordinates on a PSNR and frame-rate plane;
   transmitting the video quality target level to a terminal; and
   receiving an additional resource allocation from the terminal if a video quality of the video is less than the video quality target level.

16. The method of claim 15, further comprising:
   receiving withdraw redundant resources if the video quality of the video is not less than the video quality target level.

17. A server, comprising:
   a communication unit configured to transmit and receive signals; and
   a control unit coupled to the communication unit, wherein the control unit is configured to:
   configure a video quality target level in a range formed of at least two coordinates on a PSNR and frame-rate plane;
   transmit the video quality target level to a terminal; and
   receive an additional resource allocation from the terminal if a video quality of the video is less than the video quality target level.

18. The method of claim 17, wherein the control unit is further configured to:
   receive withdraw redundant resources if the video quality of the video is not less than the video quality target level.

\* \* \* \* \*